United States Patent [19]

Petschauer

[11] B 3,999,051

[45] Dec. 21, 1976

[54] ERROR LOGGING IN SEMICONDUCTOR STORAGE UNITS

[75] Inventor: Richard J. Petschauer, Edina, Minn.

[73] Assignee: Sperry Rand Corporation, New York, N.Y.

[22] Filed: Mar. 28, 1975

[21] Appl. No.: 563,419

[44] Published under the second Trial Voluntary Protest Program on March 23, 1976 as document No. B 563,419.

Related U.S. Application Data

[63] Continuation-in-part of Ser. No. 486,033, July 5, 1974, Pat. No. 3,906,200.

[52] U.S. Cl. .................. 235/153 AK; 235/153 AM
[51] Int. Cl.² .................. G06F 11/12; G11C 29/00
[58] Field of Search ............ 235/153 AK, 153 AM, 235/153 AC; 340/172.5, 146.1 A X

[56] References Cited

UNITED STATES PATENTS

| | | | |
|---|---|---|---|
| 3,350,690 | 10/1967 | Rice | 340/172.5 |
| 3,659,088 | 4/1972 | Boisvert, Jr. | 235/153 AC |
| 3,704,363 | 11/1972 | Salmassy | 235/153 AK |
| 3,735,105 | 5/1973 | Maley | 235/153 AC |
| 3,803,560 | 4/1974 | DeVoy et al. | 235/153 AK |
| 3,872,291 | 3/1975 | Hunter | 235/153 AK |
| 3,893,071 | 7/1975 | Bossen et al. | 235/153 AM |
| 3,898,443 | 8/1975 | Smith | 235/153 AM |

Primary Examiner—Charles E. Atkinson
Attorney, Agent, or Firm—Kenneth T. Grace; Thomas J. Nikolai; Marshall M. Truex

[57] ABSTRACT

A maintenance procedure comprising a method of and an apparatus for storing information identifying the location of one or more defective bits, i.e., a defective memory element, a defective storage device or a failure, in a single-error-correcting semiconductor main storage unit (MSU) comprised of a plurality of large scale integrated (LSI) bit planes. The method utilizes an error logging store (ELS) comprised of 128 word-group-associated memory registers, each memory register storing 1 tag bit and 6 syndrome bits. Upon determination of a single bit error during the readout of a word from the MSU, stored in the ELS are: (1) a tag bit that when set signifies that a defective bit has been determined to be in the one associated word group; and, (2) a group of 6 syndrome bits that identifies that one of the 45, 1024-bit planes of the one associated word group that contains the defective bit. A defective device counter (DDC) counts the set tag bits in the ELS and is utilized by the machine operator to schedule preventative maintenance of the MSU by replacing the defective bit planes. By statistically determining the number of allowable failures, i.e., the number of correctable failures that may occur before the expected occurrence of a noncorrectable double bit error, preventative maintenance may be scheduled only as required by the particular MSU.

5 Claims, 6 Drawing Figures

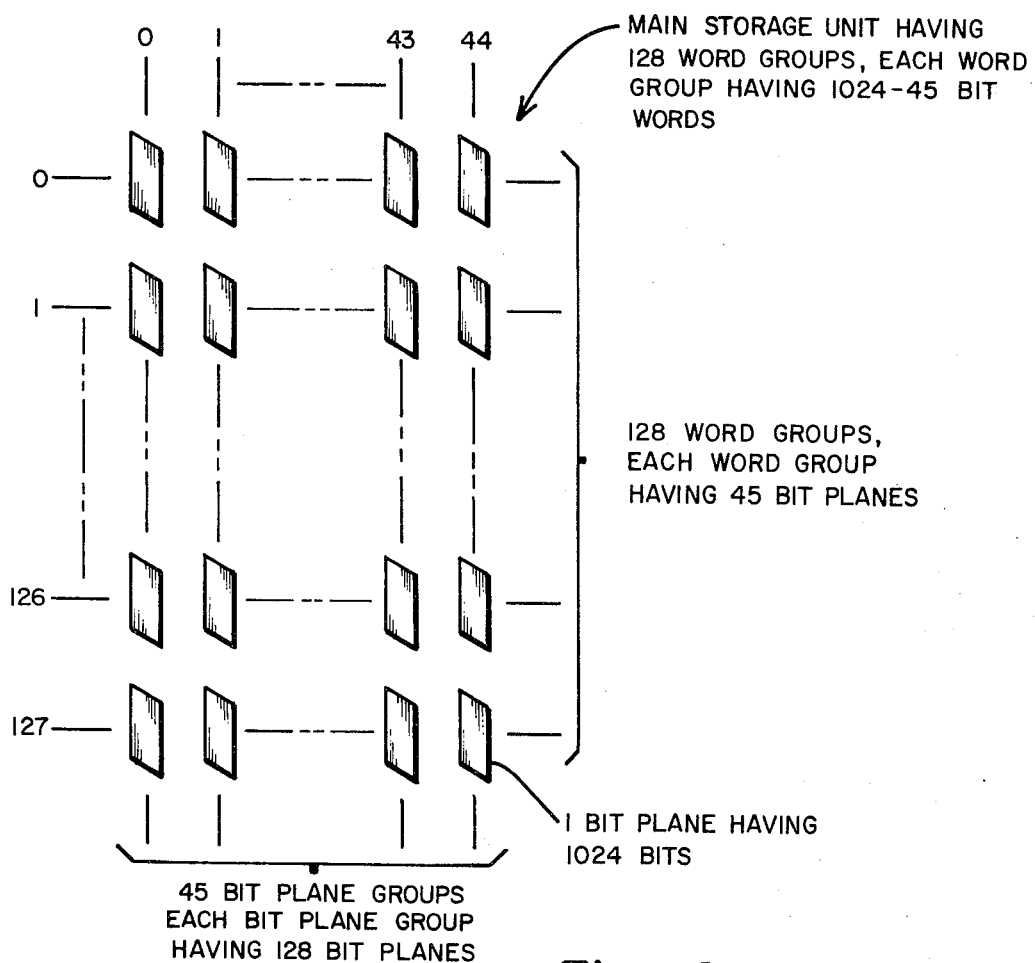
Fig. 2
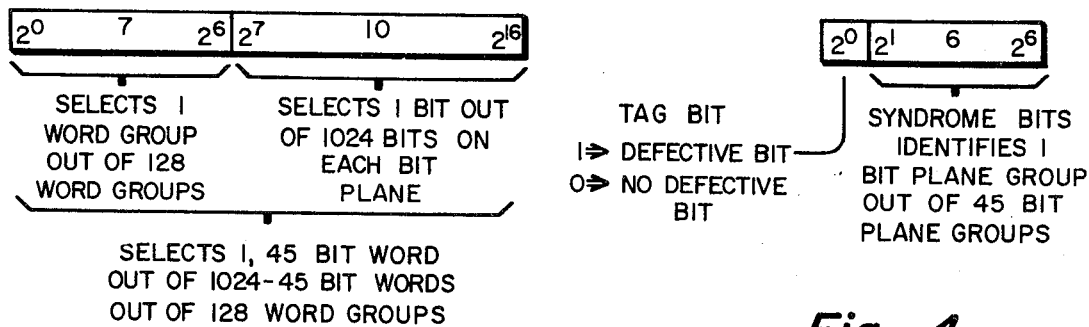
Fig. 3
Fig. 4

ERROR LOGGING IN SEMICONDUCTOR STORAGE UNITS

CROSS-REFERENCE TO RELATED APPLICATION

The present application is a continuation-in-part application of my earlier filed parent application Ser. No. 486,033 filed July 5, 1974, now U.S. Pat. No. 3,906,200.

BACKGROUND OF THE INVENTION

Semiconductor storage units made by large scale integrated circuit techniques have proven to be cost-effective for certain applications of storing digital information. Most storage units are comprised of a plurality of similar storage devices or bit planes each of which is organized to contain as many storage cells or bits as feasible in order to reduce per bit costs and to also contain addressing, read and write circuits in order to minimize the number of connections to each storage device. In many designs, this has resulted in an optimum storage device or bit plane that is organized as N words of 1 bit each, where N is some power of two, typically, 256, 1024 or 4096. Because of the 1 bit organization of the storage device, single bit error correction as described by Hamming in the publication *Error Detecting and Correcting Codes*, R. W. Hamming, The Bell System Journal, Vol. XXIX, April, 1950, No. 2, pp. 147-160, has proven quite effective in allowing partial or complete failure of a single storage cell or bit in a given word, i.e., a single bit error, the word being of a size equal to the word capacity of the storage unit, without causing loss of data readout from the storage unit. This increases the effective mean-time-between-failure (MTBF) of the storage unit.

Becauses the storage devices are quite complex, and because many are used in a semiconductor storage unit, they usually represent the predominant component failure in a storage unit. Consequently, it is common practice to employ some form of single bit error correction along the lines described by Hamming. While single bit error correction allows for tolerance of storage cell failures, as more of them fail the statistical chance of finding two of them, i.e., a double bit error, in the same word increases. Since two failing storage cells in the same word cannot be corrected, it would be desirable to replace all defective storage devices before this occurred, such as at a time when the storage unit would not be in use but assigned to routine preventative maintenance.

While it would be possible to replace each defective storage device shortly after it failed, this normally would not be necessary. It would be more economical to defer replacement until several storage devices were defective thereby achieving a better balance between repair costs and the probability of getting a double failure in a given word. One technique for doing this is to use the central processor to which the storage unit is connected to do this as one of its many other tasks under its normal logic and program control. However, this use of processor time effectively slows down the processor for its intended purpose since time must be allocated to log errors from the storage unit. The effect of this can be better understood when it is noted that a complete failure of a storage device in an often-used section of the storage unit may require a single error to be reported every storage cycle. Since the processor may need several storage cycles to log the error, a great loss of performance would result. One method which has been used to alleviate this is to sample only part of the errors, but this causes lack of logging completeness.

The novel procedure described herein alleviates the above problem by not reporting the same defective device every time it is read out. This procedure also has the advantage that no modifications need to be made to the logic of the central processor when a storage unit is replaced with one that embodies error correction features. This allows, for example, the inclusion of error correction in a storage unit and connection of it to an existing or in-use processor without any changes to the processor at installation time.

BRIEF DESCRIPTION OF THE DRAWINGS

FIG. 2 is an illustration of how the replaceable 1024 bit planes are configured in the MSU of FIG. 1.

FIG. 3 is an illustration of the format of an address word utilized to address a word in the MSU of FIG. 1.

FIG. 4 is an illustration of the format of the tag bit and syndrome bits stored in the ELS of FIG. 1.

DESCRIPTION OF THE PREFERRED EMBODIMENT

Figure 1:
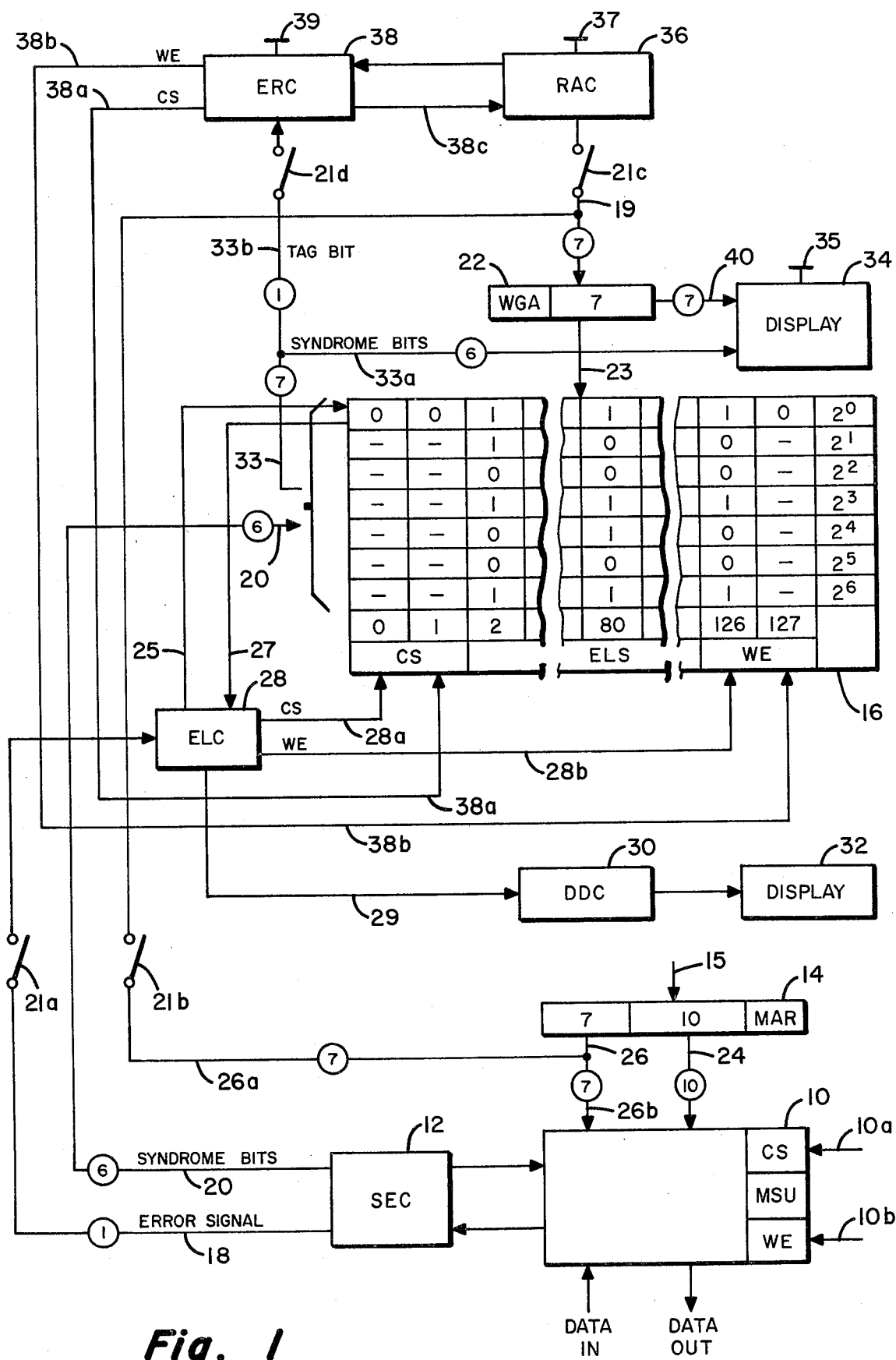
FIG. 1 is an illustration of a memory system incorporating the present invention.

With particular reference to FIG. 1 there is illustrated a memory system incorporating the present invention. The Main Storage Unit (MSU) 10 is of a well-known design configured according to FIG. 2. MSU 10 may be a semiconductor memory having, for example, 131K words, each 45 bits in length, containing 38 data bits and 7 check bits. MSU 10 may also be organized into 128 word groups, each word group having 45 bit planes, each bit plane being a large scale integrated (LSI) plane of 1024 bits or memory locations. A commercially available semiconductor memory system that would be suitable for implementing the Main Storage Unit (MSU) 10 and the Single Error Correction Circuit (SEC) 12 of the present invention would be the Intel Corp. Part No. IN-1010. The like-ordered bit planes of each of the 128 word groups are also configured into 45 bit plane groups, each of 128 bit planes. Addressing of the MSU 10 may be achieved by concurrently selecting one out of the 128 word groups and one like-ordered bit out of the 1024 bits of each of the 45 bit planes in the one selected word group. This causes the simultaneous readout, i.e., in parallel, of the 45 likeordered bits that constitute the one selected or addressed word.

With particular reference to FIG. 3 there is illustrated the format of an address word utilized to select or address one word out of the 131K words stored in MSU 10. In this configuration of the address word, the lower-ordered 7 bits, $2^0 - 2^6$, according to the 1's or 0's in the respective bit locations $2^0 - 2^6$, select one word group out of the 128 word groups, while the higher-ordered 10 bits, $2^7 - 2^{16}$, select or address one bit of the 1024 bits on each of the 45 bit planes in the word group selected by the lower-ordered bits $2^0 - 2^6$.

MSU 10 utilizes a single error correction circuit (SEC) 12 for the determination and correction of single bit errors in each of the 45-bit words stored therein. Also illustrated is a memory address register (MAR) 14 for addressing or selecting one out of the 131K 45-bit words stored in MSU 10.

SEC 12 while correcting any single error in the word addressed in MSU 10 also generates an error word comprising two other signals: a tag bit or error signal, a 1 bit denoting an error condition or a 0 bit denoting no error condition; and 6 syndrome bits that identify the one bit plane group that contains the defective bit out of the 45 bit plane groups in which MSU 10 is configured as previously discussed with particular reference to FIG. 2. The 1 tag bit and the 6 syndrome bits generated by SEC 12 are as illustrated in FIG. 4.

In accordance with the present invention, there is provided an error logging store (ELS) 16 for receiving and holding the single tag bit and the 6 syndrome bits generated by SEC 12. A semiconductor memory device that would be highly suitable for implementing Error Logging Store (ELS) 16 is the Intel Corp. Part No. 3107. Accordingly, ELS 16 may be a LSI semiconductor memory array comprising 128 7-bit memory registers, each memory register having a bit position $2^0$ for holding the tag bit (a 1 indicating a defective bit, or a 0 indicating no defective bit) and bit positions $2^1 - 2^6$ for holding the 6 syndrome bits that identify the one of the 45 bit planes of the word group that is denoted by the associated memory register 0–127, each of the 128 memory registers being dedicated to represent the one like-ordered word group, i.e., memory register 2 represents word group 2. As an example of the above ELS 16 is illustrated as having stored in bit positions $2^0 - 2^6$ of its memory register 2 the 7-bit binary word $$1\ 1\ 0\ 1\ 0\ 0\ 1$$

which, using the format of FIG. 4 and because the tag bit in bit position $2^0$ is a 1, denotes that bit plane 37 in word group 2 has a defective bit therein.

MSU 10, SEC 12 and MAR 14 operate to form a memory system that employs single error correction, i.e., any one bit in any one of the 131K 45-bit words, if defective, is correctable by SEC 12 permitting the associated data processing system to function as if no error had been detected. However, two or more errors, i.e., two or more bits in any one word being defective, are noncorrectable by SEC 12 requiring the associated data processing system to institute other error correcting procedures, e.g., to reload the erroneous data word back into MSU 10 from another source. In the present invention, ELS 16 is utilized to record what bit plane out of 128 × 45 bit planes the correctable single error was detected and corrected. That is, whenever a correctable single error is detected upon the readout of a word stored in MSU 10, SEC 12 operates to correct that error and to generate an error word. The error word, which is comprised of a single tag bit 1 that is coupled to line 18 and 6 syndrome bits that are coupled to line 20, per FIG. 4, when stored in the associated word group defining memory register of ELS 16, identifies the one bit plane, containing 1024 bits, out of the 128 × 45 bit planes in MSU 10 in which the error was detected. MAR 14, by means of its 7 lower-ordered bits $2^0 - 2^6$ and word group address register (WGA) 22, addresses or selects in ELS 16 the one out of the 128 memory registers 0 – 127 that is dedicated to the one word group that contains the one bit plane in which the correctable single error was detected by SEC 12.

As an example, assume that SEC 12 detects that a single error has occurred upon the readout of a particular 45-bit word from MSU 10 addressed by MAR 14 via lines 24 and 26b. If MAR 14 contains in its 7 lower-ordered bit positions $2^0 - 2^6$ the multi-bit address word $$0\ 1\ 0\ 0\ 0\ 0\ 0,$$

these 7 lower-ordered bits are transferred to WGA 22 via line 26a selecting ELS 16 memory register, or address, 2. Then, SEC 12, via line 18, couples an error signal to ELC 28 that, via line 27, tests bit position $2^0$ of memory register 2 for the presence of a tag bit 1. Finding a 0 stored therein ELC 28 then, via line 25, stores a tag bit 1 in bit position $2^0$ of memory register 2 of ELS 16 - indicating that a correctable error has been detected in word group 2 of MSU 10 (see FIG. 2) - and, via line 20, stores the 6 syndrome bits $$1\ 0\ 1\ 0\ 0\ 1$$

in the syndrome bit positions $2^1 - 2^6$ of memory register 2 of ELS 16, indicating that a correctable error has occurred in bit plane 37 (of word group 2 of MSU 10 as identified by the word-group-associated memory register 2 of ELS 16).

Figure 5:
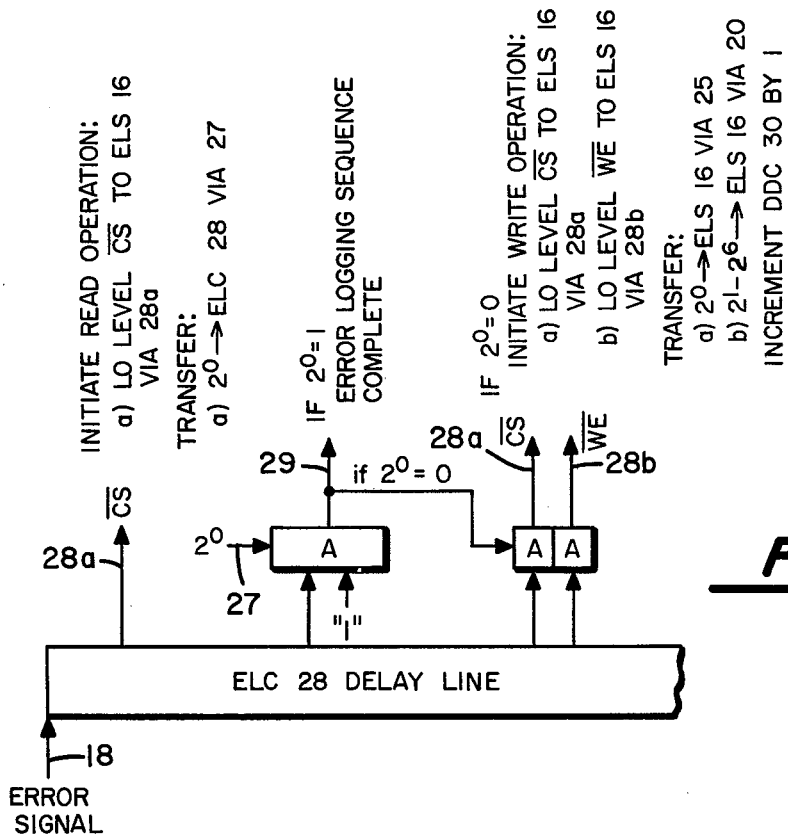
FIG. 5 is an illustration of a schematic diagram of the ELC of FIG. 1.

In general then, for the error logging mode of operation, each time a single error occurs, the error signal from SEC 12, via line 18, would activate Error Logging Control (ELC) 28 to interrogate ELS 16, using the lower-ordered 7 address bits from MAR 14 in WGA 22 to address the one word group stored in the one memory register out of the 128 word groups that are stored in the 128 memory registers that make MSU 10. The abovementioned interrogation or read operation that is accomplished when ELC 28 issues a Lo Level Chip Select (CS) on line 28a and a Hi level Write Enable (WE) on line 28b. Note that the Chip Select on line 28a is normally held at a Hi level (CS) and is switched to a Lo level (CS) to select the addressed memory register while the Write Enabale (WE) on line 28b is normally held at a Hi level (WE) to effect a Read operation and is switched to a Lo level (WE) to effect a Write operation. The 7 address bits in WGA 22 would select, from ELS 16, one of the 128 7-bit memory registers in WGA 22 in which may be stored a single tag bit and 6 syndrome bits. Bit $2^0$ of the one addressed memory register of ELS 16 is transferred via line 27 and compared in ELC 28 to the error-signal-defining tag bit 1 from SEC 12 which arrives via line 18. If bit $2^0$ of the addressed memory register of ELS 16 were a 0, it would be set to a 1 via an output signal on line 25 from ELC 28 with the 6 syndrome bits from SEC 12 then being stored in bit positions $2^1 - 2^6$ of the addressed memory register of ELS 16 via the lines in cable 20. The same control signal used for setting the $2^0$ bit position to a 1 would also be used to increment a defective device counter (DDC) 30 by a count of 1 via control line 29. Alternatively, if bit position $2^0$ had already contained a 1 (indicating that a defective bit in that 45 bit plane group had already been reported), ELC 28 would not increment DDC 30 nor would it store the 6 syndrome bits in bit positions $2^1 - 2^6$ of the addressed memory register of ELS 16. Thus, upon determinination of each correctable (single) error in MSU 10 by SEC 12, ELS 16 is addressed by WGA 22 to determine, by ELC 28, if a correctable error has been previously determined to be in the one of the 45 bit plane groups in which the present correctable error has been detected. If not, tag bit $2^0$ would be set to a 1 and the syndrome bits $2^1 - 2^6$ generated by SEC 12 would, via line 20, be stored in the addressed memory register of ELS 16. Accordingly, DDC 30 would count and display by means of Display 32 the total number of bit plane groups - out of 128 bit plane groups - in which one or more correctable (single) errors have been detected. See FIG. 5 for a schematic representation of ELC 28 of FIG. 1.

Figure 6:
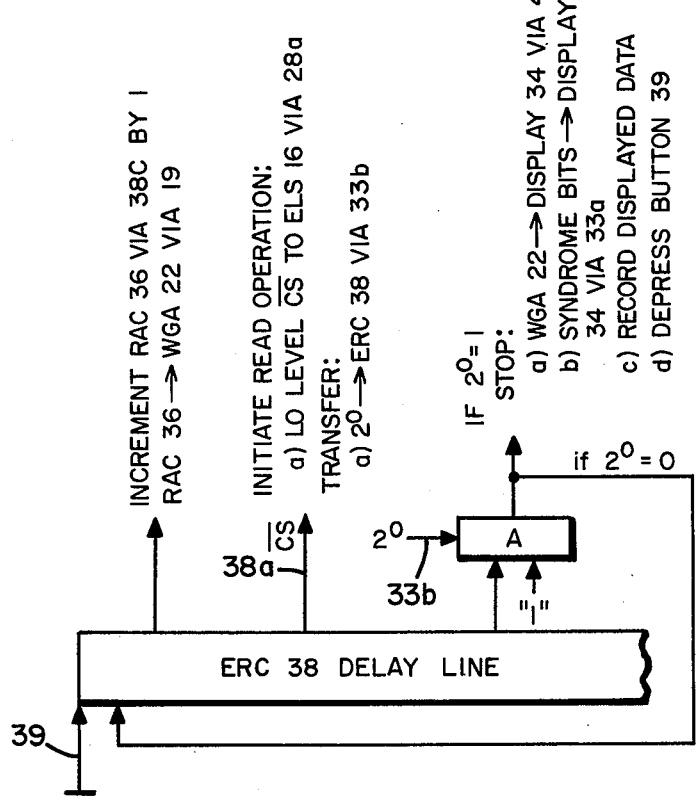
FIG. 6 is an illustration of a schematic diagram of the ERC of FIG. 1.

Further, once the operator has determined that preventative maintenance should be performed upon MSU 10 by his monitoring of the defective device count displayed by Display 32, the error readout mode of operation is initiated. For this mode of operation the operator opens normally closed switches 21a, 21b and closes normally open switches 21c, 21d. With WGA 22 set to address memory register 0 of ELS 16 by means of Read Address Counter (RAC) 36, Error Read Control (ERC) 38 (via a CS signal on line 38a and a WE signal on line 38b) interrogates ELS 16 and selects the one word group stored in bit positions $2^0 - 2^6$ of memory register 0 of ELS 16. The bit stored in bit position $2^0$ of memory register 0 of ELS 16 is coupled, via line 33b, to ERC 38 to be tested for a 1 or 0. If a 0, RAC 36 is incremented by a count of 1 with WGA 22 then set to address the next successive memory register 1. If the $2^0$ bit is a 1, WGA 22 address bits $2^0 - 2^6$, defining the selected one of the 128 memory-register-defining word groups of which MSU 10 is divided, are coupled, via cable 40, to Display 34, while, concurrently, the Error Word stored in bit positions $2^0 - 2^6$ of the one memory register of ELS 16 that is addressed by WGA 22 and which defines which of the 45 bit planes of the particular one of the 128 word groups into which MSU 10 is divided, is coupled, via line 33a, to Display 34. These two groups of 7 bits each fully define the addressed one of the $128 \times 45 = 5760$ bit planes of which MSU 10 is comprised. The operator then records these data displayed by Display 34 for subsequent preventative maintenance of MSU 10 by replacement of the identified defective bit plane. The operator then increments RAC 36 by a count of 1 and repeats the above, proceeding through memory registers 0 through 127 of MSU 10. See FIG. 6 for a schematic representation of ERC 38 of FIG. 1.

ERROR LOGGING MODE

Switch: 21a, 21b Closed; 21c, 21d Open

START

1. MSU 10 Address bits $2^0 - 2^{16}$ are coupled to MAR 14 via line 15
   A. MAR 14 Address bits $2^0 - 2^6$ are coupled to
      1. WGA 22 via line 26a
      2. MSU 10 via line 26b
   B. MAR 14 Address bits $2^7 - 2^{16}$ are coupled to
      1. MSU 10 via line 24.
2. CS on line 10a is at a Lo level.
3. WE on line 10b is at a Hi level.
4. SEC 12 tests the check bits of the Data Word that is stored in the one MSU 10 memory register that is addressed by MAR 14 address bits $2^0 - 2^{16}$
   A. SEC 12 determines that the addressed Data Word is valid, no Error Word is generated, and, accordingly, the Error Logging Sequence is Completed until another Step 1 occurs.
   B. SEC 12 determines that the addressed Data Word is invalid, and, accordingly, it generates an Error Word consisting of
      1. Error Signal that is coupled to line 18, and
      2. Six Syndrome Bits that are coupled to line 20.
5. ELC 28, in response to the Error Signal on line 18, addresses ELS 16 to read out the Tag bit that is stored in bit position $2^0$ of the memory register that is addressed by WGA 22 address bits $2^0 - 2^6$ by coupling a
   A. Lo level CS to line 16a, and a
   B. Hi level WE to line 16b.
6. ELC 28, via line 27, tests the Tag bit that is stored in bit position $2^0$ of the memory register that is selected by WGA 22 address bits $2^0 - 2^6$
   A. ELC 28 determines that the Tag bit is a 1 indicating that a defective bit has already been logged in the addressed 1 of the 128 memory registers of ELS 16, and, accordingly, the Error Logging Sequence is Completed until another Step 1 occurs.
   B. ELC 28 determines that the Tag bit is a 0 indicating that a defective bit has not previously been logged in the addressed 1 of the 128 memory registers of ELS 16.
7. ELC 28 addressed ELS 16 to write a Tag bit 1, via line 25, into bit position $2^0$ and the six Syndrome bits, via line 20, into bit positions $2^1 - 2^6$ of the addressed 1 of the 128 memory registers of ELS 16 by coupling a
   A. Lo level CS to line 16a, and a
   B. Lo level WE to line 16b.
8. ELC 28 writes the Tag bit and the six Syndrome bits into the addressed one of the 128 memory registers of ELS 16 by the
   A. Error signal defining Tag bit on line 25, and the
   B. Six Syndrome bits on line 20.
9. ELC 28 increments DDC 30 by coupling an error signal defining defective device count to line 29, after which the Error Logging Sequence is Completed until another Step 1 occurs.

STOP

ERROR READOUT MODE

Switch: 21a, 21b Open; 21c, 21d Closed

START

1. Operator via button 37 of RAC 36 sets RAC 36 to all 1's.
2. Operator via button 39 of ERC 38
   A. Increments RAC 36 by a count of 1 (if RAC 36 was all 1's, they are Set to all 0's by this action) and transfers, via line 19, the contents of RAC 36 to WGA 22 selecting the addressed memory register of ELS 16.
   B. ERC 38 than addresses ELS 16 to read out the Error Word stored in the memory register addressed by WGA 22 address bits $2^0 - 2^6$ by coupling a
      1. Lo level CS to line 38a, and then a
      2. Hi level WE to line 38b.
3. The Tag bit read out of bit position $2^0$ of the Error Word stored in the memory register addressed by WGA 22 address bits is coupled to ERC 38 via line 33b.
4. ERC 38 tests the Tag bit
   A. ERC 38 determines that the Tag bit is a 0 indicating that a defective bit has not been logged in the addressed 1 of the 128 memory registers of ELS 16, and, accordingly, increments RAC 36 by a count of 1 and, via line 19, transfers the contents of RAC 36 to WGA 22 addressing the next successive memory register of ELS 16
  1. Steps 2 through 4A are repeated until WGA 22 is set to all 1's at which time the Error Readout Sequence is Completed, unless one of the Step 4 operations for a given address contains a Tag bit of a 1 in which case Step 4b takes place.
  B. ERC 28 determines that the Tag bit is a 1 indicating that a defective bit has been logged in the addressed 1 of 128 memory registers of ELS 16.
5. WGA 22 address bits $2^0 - 2^6$, which define the addressed 1 of the 128 Word groups of which MSU 10 is divided, are, via line 40, coupled to Display 34 while, concurrently, the Syndrome bits stored in bit positions $2^1 - 2^6$ of the one memory register of ELS 16 that is addressed by WGA 22 and which defines the 1 of 45 bit planes of the 1 of 128 word groups of which MSU 10 is divided, is, via line 33a, coupled to Display 34. These two groups, of 7 and 6 bits each, respectively, fully define the addressed 1 of the $128 \times 45 = 5760$ bit planes of which MSU 10 is comprised. The operator, via button 35, displays these address bits and the Error Word on Display 34.
6. The operator records the data displayed by Display 34 for subsequent preventative maintenance of MSU 10 by replacement of the identified defective bit plane.
7. The operator returns to Step 2 and via button 39 increments RAC 36 by a count of 1 and repeats Steps 2–5 until RAC 36 contains all 1's at which time the Error Readout Mode is Completed.

STOP

The primary purpose for error correction in a semiconductor memory, such as MSU 10, is to allow a permissible tolerance of failing semiconductor storage devices or bits. Further, the primary purpose of error logging in ELS 16 is to indicate when the number of defective devices increases to that point that a noncorrectable double error may occur such that preventative maintenance may be performed on the semiconductor memory (MSU) prior to the time such noncorrectable double error may be expected (statistically) to occur. In the embodiment of FIG. 1 the error logging in ELS 16 provides information to the machine operator, by means of DDC 30 and Display 32 and Display 34, the number of correctable (single) errors that have occurred since the last preventative maintenance and the specific location of those correctable errors are the level of replaceable components as defined by the 1 bit plane within the 1 word group. Thus, the method of error logging as exemplified by FIG. 1 permits the machine operator to continuously monitor the number of correctable errors that have been detected, to determine in what replaceable component, such as a replacement LSI bit plane of 1024 bits, the correctable errors occurred and to schedule preventative maintenance prior to the expected occurrence of noncorrectable double errors within MSU 10.

What is claimed is:

1. In a procedure for scheduling preventative maintenance in a memory system that is configured into a plurality of bit planes and a plurality of bits per bit plane, each bit plane being a replaceable component that is replaced upon the detection of a defective bit therein, the method comprising:

arranging an error logging store to be comprised of a plurality of memory registers;

generating, upon the detection of a defective bit in each bit plane, an error word that is associated with the defective bit plane in which the defective bit is detected, said error word comprising a single tag bit;

testing the bit that is stored in the tag bit position of a memory register that is associated with the defective bit plane with which the generated error word is associated;

storing said generated error word in one of said memory registers of said error logging store only if said test indicates that a defective bit has not been previously detected in the associated one of said bit planes;

generating a defective device count only if said test indicates that a defective bit has not been previously detected in the associated one of said bit planes;

incrementing a defective device counter only upon the generation of each of said defective device counts;

monitoring said defective device counter until said monitored defective device count reaches a predetermined magnitude;

testing the bit that is stored in each of the tag bit positions of each of said memory registers;

reading out the error word that is stored in each of said memory registers only if said test indicates that an error word has been previously stored in the associated one of said memory registers;

monitoring said read out error words;

recording said read out error words and the associated defective bit plane;

providing preventative maintenance of said said memory system by replacing said defective bit planes with non-defective bit planes.

2. In a procedure for scheduling preventative maintenance in a single error correction memory system that is configured into M word groups of N bit planes per word group and B bits per bit plane, each bit plane being a replaceable component upon the detection of a defective bit therein that provides a correctable error upon readout, the method comprising:

arranging an error logging store to be comprised of M memory registers, each memory register dedicated to represent only an associated different one of said M word groups;

generating upon the detection of each correctable error a generated error word that is associated with the one of the M word groups in which the correctable error is detected, said generated error word comprising a single tag bit and a group of syndrome bits, said tag bit indicating that a correctable error has occurred in said one of M word groups in the one of N bit planes that is identified by said group of syndrome bits;

testing the bit that is stored in the tag bit position of the one of M memory registers that is dedicated to the one of M word groups to which the generated error word is associated;

storing said generated error word in its associated one of said M memory registers only if said test indicates that a correctable error has not previously occurred in the associated one of said M word groups;

generating a defective device count only if said test indicates that a correctable error has not previously occurred in the associated one of said M word groups;

incrementing a defective device counter upon the generation of each of said defective device counts;

monitoring said defective device counter until said monitored defective device count reaches a predetermined mangitude;

sequentially testing the bit that is stored in the tag bit position of each of said M memory registers;

sequentially reading out the groups of syndrome bits that are stored in each of said M memory registers only if said test indicates that a correctable error has previously occurred in the associated one of said M word groups;

monitoring said read out syndrome bits;

recording said read out syndrome bits and the one of M word groups in which the one bit plane in which the defective bit as defined by said syndrome bits is located;

providing preventative maintenance of said memory system by replacing said defective bit planes with non-defective bit planes.

3. In a procedure for scheduling preventative maintenance in a single error correction memory system that is configured into M word groups of N bit planes per word group and B bits per bit plane, each bit plane being a replaceable component upon the detection of a defective bit therein that provides a correctable error upon readout, the method comprising:

arranging an error logging store to be comprised of M memory registers, each memory register dedicated to represent only an associated different one of said M word groups;

generating upon the detection of each correctable error a generated error word that is associated with the one of the M word groups in which the correctable error is detected, said generated error word comprising a single tag bit and a group of syndrome bits, said tag bit indicating that a correctable error has occurred in said one of M word groups in the one of N bit planes of said word group that is identified by said group of syndrome bits;

testing the tag bit that is stored in the tag bit position of the one of M memory registers that is dedicated to the one of M word groups to which the generated error word is associated;

storing said group of syndrome bits in its associated one of said M memory registers only if said test indicates that a correctable error has not previously occurred in the associated one of said M word groups;

generating a defective device count only if said test indicates that a correctable error has not previously occurred in the associated one of said M word groups;

incrementing a defective device counter only upon the generation of each of said defective device counts;

monitoring said defective device counter until said monitored defective device count reaches a predetermined magnitude;

sequentially testing the bit that is stored in the tag bit position of each of said M memory registers;

sequentially reading out the syndrome bits stored in each of said M memory registers only if said test indicates that a correctable error has previously occurred in the associated one of said M word groups;

monitoring said read out syndrome bits;

recording said read out syndrome bits and the one of M word groups in which the one bit plane in which the defective bit as defined by said syndrome bits is located;

providing preventative maintenance of said memory system by replacing said defective bit planes with non-defective bit planes.

4. In a data processing system that includes an LSI semiconductor memory system that is configured into M word groups of N bit planes per word group and B bits per bit plane, each bit plane being a replaceable component upon the detection of a defective bit therein that provides a correctable error upon readout and single error correction circuitry coupled to said memory system for generating upon the detection of each correctable error in said memory system a generated error word that is associated with the one of M word groups in which the correctable error is detected, said generated error word comprising a single tag bit and a group of syndrome bits, said tag bit indicating that a correctable error has occurred in said one of M word groups in the one bit plane that is identified by said group of syndrome bits, the improvement comprising:

an error logging store comprised of M memory registers, each memory register dedicated to represent only an associated different one of said M word groups;

error logging control means responsively coupled to said single error correction circuitry and said error logging store for testing the bit that is stored in the tag bit position of the one of the M memory registers that is dedicated to the one of the M word groups to which the generated error word is associated, said error logging control means generating a defective device count only if said test indicates that a group of syndrome bits has not been previously stored in the associated one of said M memory registers;

said error logging control means transferring said group of syndrome bits from said single error correction circuitry to said error logging store for storing it in its associated one of said M memory registers of said error logging store only if said test indicates that a group of syndrome bits has not been previously stored in the associated one of said M memory registers;

defective device counter means responsively coupled to said error logging control means for incrementing its count only upon the generation of each of said defective device counts;

defective device count display means responsively coupled to said defective device counter means for monitoring said defective device count;

error read control means coupled to said error logging store for testing the bits that are stored in the tag bit positions of said M memory registers;

said error read control means reading out said groups of syndrome bits stored in the ones of said M memory registers of said error logging store that are associated with said tested bits only if said tests indicate that groups of syndrome bits are stored therein;

bit plane identifying disply means responsively coupled to said error logging store for displaying said groups of syndrome bits.

5. In a data processing system that includes an LSI semiconductor memory system that is configured into M word groups of N bit planes per word group and B bits per bit plane, each bit plane being a replaceable component upon the detection of a defective bit therein that provides a correctable error upon readout and single error correction circuitry coupled to said memory system for generating upon the detection of each correctable error in said memory system a generated error word that is associated with the one of M word groups in which the correctable error is detected, said generated error word comprising a single tag bit and a group of syndrome bits, said tag bit indicating that a correctable error has occurred in said one of M word groups in the one bit plane that is identified by saids group of syndrome bits, the improvement comprising:

an error logging store comprised of M memory registers, each memory register dedicated to represent only an associated different one of said M word groups;

error logging control means responsively coupled to said single error correction circuitry and said error logging store for testing the bit that is stored in the tag bit position of the one of the M memory registers that is dedicated to the one of the M word groups to which the generated error word is associated, said error logging control means generating a defective device count only if said test indicates that a group of syndrome bits has not been previously stored in the associated one of said M memory registers;

said error logging control means transferring said group of syndrome bits from said single error correction circuitry to said error logging store for storing it in its associated one of said M memory registers of said error logging store only if said test indicates that a group of syndrome bits has not been previously stored in the associated one of said M memory registers;

defective device counter means responsively coupled to said error logging control means for incrementing its count only upon the generation of each of said defective device counts;

defective device count display means responsively coupled to said defective device counter means for monitoring said defective device count;

error read control means coupled to said error logging store for sequentially testing the bits that are stored in the tag bit positions of each of said M memory registers;

said error read control means reading out the group of syndrome bits stored in the one of said M memory registers of said error logging store that is associated with said tested bit only if said test indicates that a group of syndrome bits is stored therein;

bit plane identifying display means responsively coupled to said error logging store for displaying said group of syndrome bits.

* * * * *